United States Patent
Neuendorffer et al.

(10) Patent No.: US 7,653,762 B1
(45) Date of Patent: Jan. 26, 2010

(54) PROFILING CIRCUIT ARRANGEMENT

(75) Inventors: Stephen A. Neuendorffer, San Jose, CA (US); Peter Oruba, Dresden (DE)

(73) Assignee: XILINX, Inc., San Jose, CA (US)

( * ) Notice: Subject to any disclaimer, the term of this patent is extended or adjusted under 35 U.S.C. 154(b) by 102 days.

(21) Appl. No.: 11/973,037

(22) Filed: Oct. 4, 2007

(51) Int. Cl.
*G06F 3/00* (2006.01)
(52) U.S. Cl. ........................................ 710/18; 710/305
(58) Field of Classification Search ................. 710/305, 710/19, 18; 702/127; 326/39
See application file for complete search history.

(56) References Cited

U.S. PATENT DOCUMENTS

| | | | |
|---|---|---|---|
| 4,378,495 A | * | 3/1983 | Miller ..................... 250/223 B |
| 4,670,711 A | * | 6/1987 | Daniels ................... 324/76.16 |
| 4,750,591 A | * | 6/1988 | Coste et al. ................. 187/391 |
| 4,764,681 A | * | 8/1988 | Michalski et al. ...... 250/559.48 |
| 4,862,394 A | * | 8/1989 | Thompson et al. .......... 702/166 |
| 5,696,455 A | * | 12/1997 | Madurawe .................... 326/41 |

OTHER PUBLICATIONS

U.S. Appl. No. 10/402,057, Jenkins, IV, Jesse H., filed Mar. 27, 2003, entitled "Methods and Circuits for Realizing a Performance Monitor for a Processor from Programmable Logic". 23 pages, Xilinx, Inc. 2100 Logic Drive, San Jose, CA.

* cited by examiner

*Primary Examiner*—Clifford H Knoll
(74) *Attorney, Agent, or Firm*—LeRoy D. Maunu

(57) ABSTRACT

Various approaches for tracing events in an electronic system are disclosed. In one approach, a circuit arrangement includes a bus, a random access memory (RAM), a plurality of programmable logic resources, and coupled configuration memory cells. A circuit arrangement is implemented in the programmable logic. The circuit arrangement receives a plurality of event indication signals from an application circuit and writes event data to the RAM in response to a change in the state of any one of the event indication signals. A bus interface circuit is coupled to the bus and to the read port of the RAM. Responsive to a read transaction on the bus for the RAM, the bus interface circuit reads data from the RAM and outputs the data on the bus in a reply bus transaction.

16 Claims, 4 Drawing Sheets

US 7,653,762 B1

PROFILING CIRCUIT ARRANGEMENT

FIELD OF THE INVENTION

The present invention generally relates to profiling system behavior via software controlled and hardware initiated events.

BACKGROUND

A system on a chip (SOC) includes components such as a processor, a memory, a bus, various peripheral components coupled to the bus, and may also include programmable logic that implements user-specific functions. Once a design is implemented on an SOC, it may be necessary to analyze the performance and operations of different parts of the design as implemented on different parts of the SOC. Complicating this effort is the fact that parts of the system may be implemented as software running on a processor and other parts may be implemented as circuitry implemented in programmable logic. Thus, analysis of the behavior of the various components in the system may involve a number of test tools, each with its own interface and requirements.

As the functionality of designs becomes more data dependent and designs incorporate complex control logic and communication protocols for routing data to different parts of a design, tools that measure cycle-to-cycle behavior of a system may be overloaded with data, and dataflow analyzers may be necessary. For example, in some instances it may be necessary to analyze the system performance over a long period of time. In this scenario, profiling the cycle-to-cycle behavior of the system may generate an overwhelming amount of data. Thus, dataflow based analysis may be required. In addition, it may also be necessary to simultaneously analyze the flow of data between a processor and reconfigurable logic, or to correlate events occurring in the processor with events in hardware.

Profiling and dataflow analysis tools for processor systems have a significant disadvantage for SOCs, since they generally cannot record events occurring outside of the processor. In addition, many of these dataflow analysis tools execute on the same processor as the software that is being profiled. Thus, the execution of a dataflow tool may influence the behavior of the system being analyzed.

The present invention may address one or more of the above issues.

SUMMARY

The invention provides various embodiments for tracing events in an electronic system. In one embodiment, a structure includes a bus, a random access memory (RAM), a plurality of programmable logic resources, and coupled configuration memory cells. A circuit arrangement is implemented in the programmable logic. The circuit arrangement receives a plurality of event indication signals from an application circuit and writes event data to the RAM in response to a change in the state of any one of the event indication signals. A bus interface circuit is coupled to the bus and to the read port of the RAM. Responsive to a read transaction on the bus for the RAM, the bus interface circuit reads data from the RAM and outputs the data on the bus in a reply bus transaction. In some embodiments, the bus, the RAM, the programmable logic resources, the configuration memory cells, and the bus interface circuit are integrated on a single semiconductor die.

In another embodiment, a method is provided for tracing hardware generated and/or software controlled events in an electronic system. The method comprises transmitting by an application circuit a plurality of event indication signals. The plurality of event indication signals are received by a circuit arrangement that is implemented in a plurality of programmable logic resources and configuration memory cells of a programmable logic device (PLD). The circuit arrangement writes event data to a RAM in response to a change in the state of any one of the event indication signals. A bus interface circuit reads data from the RAM in response to a read transaction for the RAM received via a bus. The bus interface circuit outputs the data on the bus in a reply bus transaction.

An apparatus for tracing events in an electronic system is provided in another embodiment. The apparatus comprises means for transmitting by an application circuit a plurality of event indication signals; means for receiving the plurality of event indication signals by a circuit arrangement that is implemented in a plurality of programmable logic resources and configuration memory cells of a PLD; means for writing by the circuit arrangement to a RAM, in response to a change in the state of any one of the event indication signals, event data indicative of the one of the event indication signals; means for reading data from the RAM by a bus interface circuit in response to a read transaction for the RAM received via a bus; and means for outputting the data on the bus in a reply bus transaction by the bus interface circuit.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

The various embodiments of the invention support analysis of system behavior as may be exhibited by data-dependent control flows. A profiling core is implemented in programmable logic of a programmable logic device and is coupled to the application circuitry to be profiled. The profiling core is coupled to the write port of a RAM, and the read port of the RAM is coupled to a bus, which allows the profile data to be read from the RAM via memory mapped addressing. The profiling core monitors selected signals in the application circuit. When a state change is detected in one of those signals, the profiling core writes event data to the RAM. The event data may be indicative of the particular event and the cycle count at which the event was detected. By implementing the profiling core in programmable logic resources, event data may be collected with minimal impact on the performance of the logic being profiled.

Figure 1:
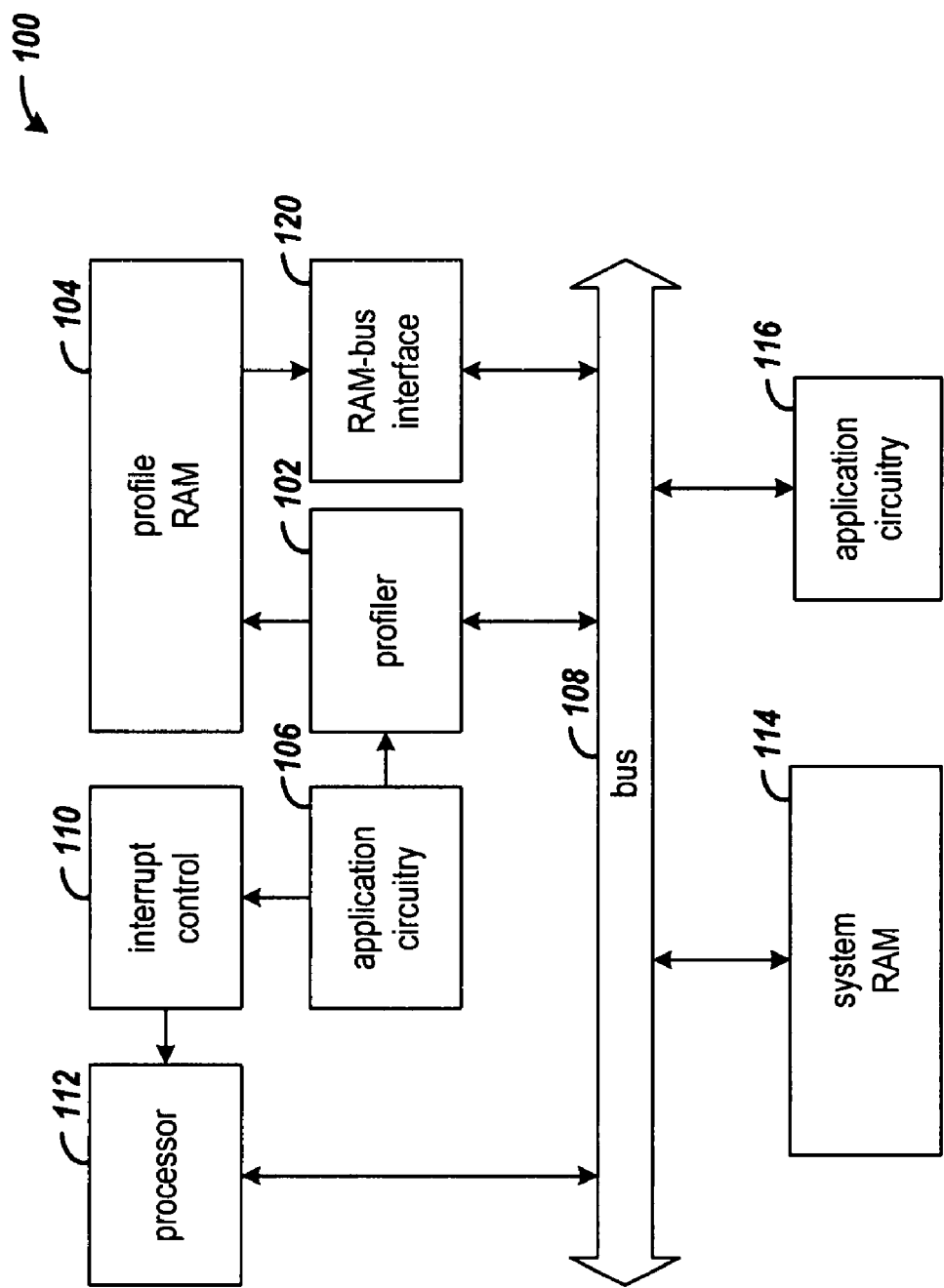
FIG. 1 is a block diagram of an example system in accordance with various embodiments of the invention.

FIG. 1 is a block diagram of an example system 100 in accordance with various embodiments of the invention. The system 100 includes a profiler circuit 102 that detects signaled events and writes data to the profile RAM 104. The data written to the profile RAM ("profile data" or "event data") describes the occurrence of those events. The profiler circuit may be coupled to application circuitry 106 and to a bus 108 and may detect events from either or both.

In one embodiment, the profiler 102 and profile RAM 104 may be implemented using programmable logic resources and RAM resources of a field programmable gate array (FPGA). The profiler and profile RAM may be provided as a logic core that may be combined with other modules in a user's design. The profiler may include an interface that allows application circuitry 106 to signal the occurrence of one or more events along with a bus interface that monitors the bus 108 for various bus events. For example, the profiler may be coupled to an Ethernet controller which signals the interrupt control 110 associated with a processor 112. Thus, the profiler can detect Ethernet events independent of bus and processor activity. The profiler may also detect bus events such as cache events associated with system RAM 114. The profiler may itself be a destination of bus transactions that write to a register set that is part of the profiler. The system 100 may include additional application circuitry 116, such as I/O circuitry, signal processing circuitry, etc., and which may also be coupled to the profiler and may or may not be coupled to the bus 108. Depending on design requirements, the application circuitry 106 and 116 may be implemented as application specific circuits, in the programmable logic resources of an FPGA, or in various combinations thereof. The application circuitry 106 and 116 may reside on the same or on a different die from the profiler 102 depending on design requirements.

In one embodiment, the profile RAM 104 is separate from the system RAM 114, as shown in FIG. 1. That is, the profile RAM has its own bus interface as does the system RAM. Thus, in recording the event data the profiler 102 does not impact the performance of either the processor, bus, or system RAM. In other embodiments (not shown), the profile RAM and the system RAM are implemented in the same RAM structure.

The processor may execute software that directly signals the occurrence of events to the profiler. In one embodiment, the LINUX® operating system may execute on the processor 112 and have device driver interfaces adapted to write to and read from the profile RAM 104. The profiler 102 may be implemented as one memory-mapped slave peripheral that is coupled to the bus 108 and the RAM-bus interface 120 may be implemented as a second memory-mapped slave peripheral that is coupled to the bus. Software executing on the processor may signal the occurrence of an event via a bus transaction that targets the profiler. The event data present in the profile RAM may be analyzed later by initiating a bus transaction that targets the RAM-bus interface for reading from the profile RAM.

Figure 2:
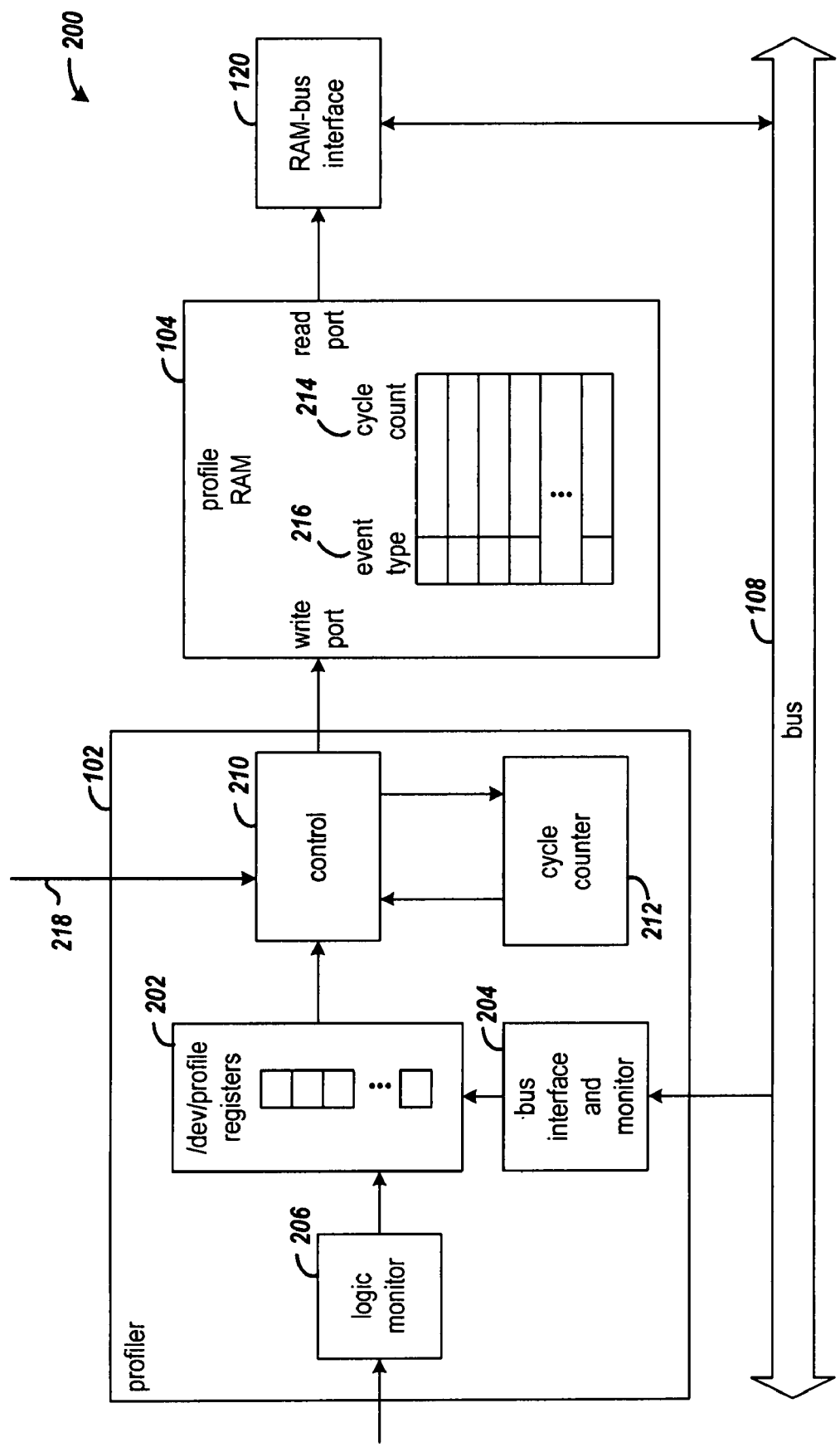
FIG. 2 is a block diagram of an example profiling circuit arrangement in accordance with various embodiments of the invention.

FIG. 2 is a block diagram of an example profiling circuit arrangement 200 in accordance with various embodiments of the invention. The profiler 102 includes a set of registers 202 that are associated with the different types of events that are profiled. There is one profile register for each of the different types of events. In one embodiment, software executing on a processor may write to the registers by writing to /dev/profile/reg-x, where x specifies one of the registers. The bus monitor 204 responds to bus transactions targeted to the registers 202 and may also monitor the bus 108 for other transactions for which profiling is desired.

The logic monitor 206 monitors non-bus circuitry for events signaled from application circuitry that is coupled to the monitor. For example, the logic monitor may respond to the rising edges of a signal by setting a bit in one of the profile registers 202, and further clearing the bit with the falling edges. When the logic monitor and bus monitor are used in combination, the logic monitor and bus interface and monitor may use different subsets of the registers 202 to avoid write conflicts.

The control circuit 210 monitors each of the profile registers 202 for a change in state. Upon detecting a state change, e.g., from 0 to 1 or from 1 to 0, the control circuit captures the value of the cycle counter 212 and writes the value to the profile RAM 104. In addition, an event type code may be stored in the profile RAM in association with the cycle count. The control circuit advances to the next storage address in the profile RAM after storing the event code and cycle count. The address space for cycle counts and associated event type codes are shown as columns 214 and 216, respectively, in the profile RAM 104. It will be appreciated that in an alternative embodiment the control circuit may be directly coupled to receive event indication signals 218 without use of the profile registers 202.

In one embodiment, once the profile RAM is full the control circuit may cease writing to the profile RAM. The event data in the profile RAM may then be read and analyzed according to diagnostic needs. Under control of the diagnostic logic or software, the profiler may be reset to once again commence monitoring for and recording the occurrence of application events. In another embodiment, the control circuit may manage the profile RAM as a circular buffer, leaving the responsibility for timely reading of data from the profile RAM to the diagnostic control which is outside the logic of the profiler.

The RAM-bus interface 120 responds to bus transactions that address the profile RAM. Software may issue a read of the /dev/profile via the operating system, where /dev/profile is mapped to the profile RAM. In response, the RAM-bus interface returns the contents of the entire profile RAM in one embodiment. Additionally or alternatively, the profile RAM may be addressable by individual event type code and/or associated cycle count.

Figure 3:
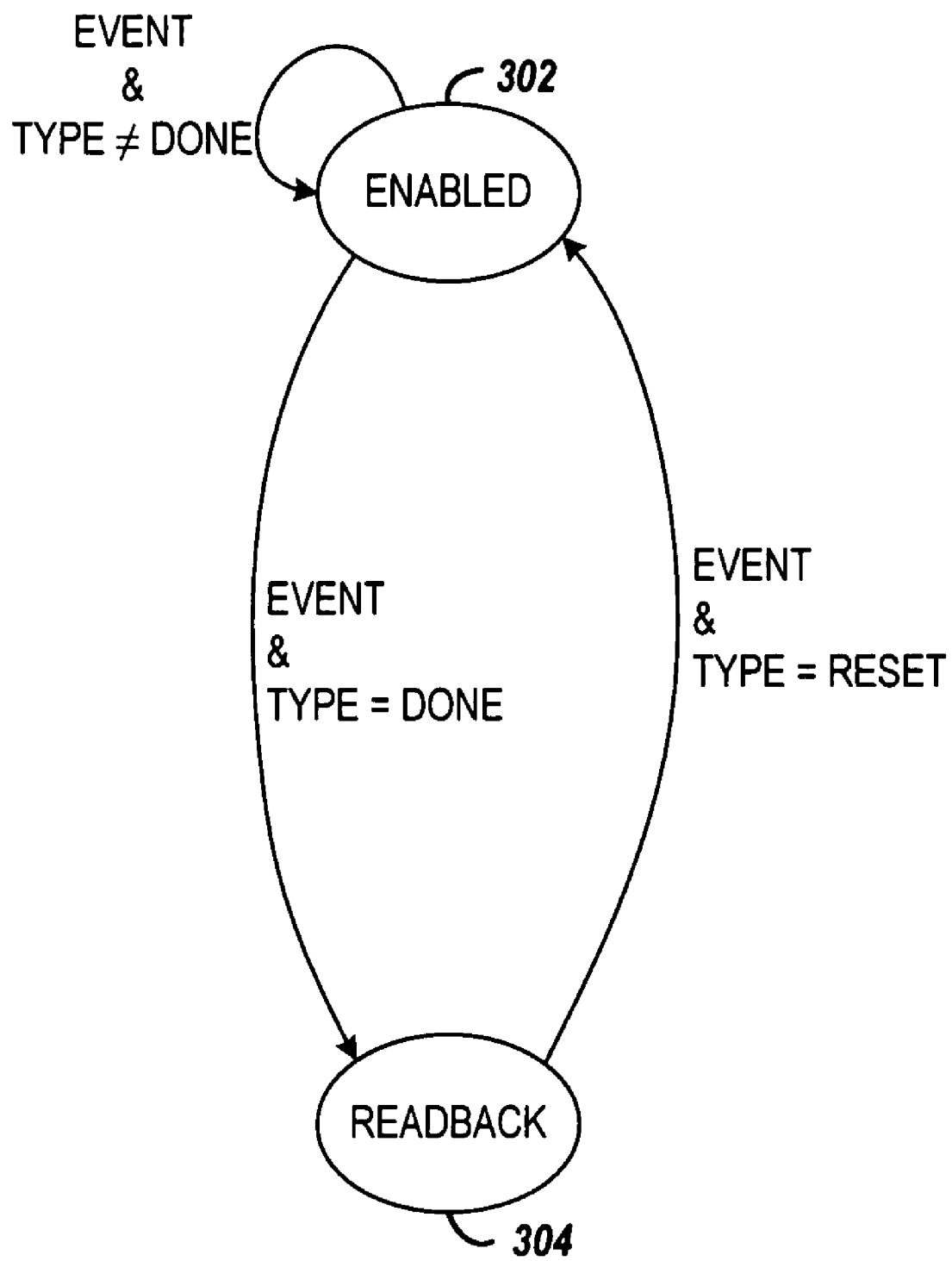
FIG. 3 is a state diagram that shows the behavior of the profiling circuit arrangement in one embodiment.

FIG. 3 is a state diagram that describes the behavior of the profiling circuit arrangement in one embodiment. The initial state is the ENABLED state 302. In response to any profiling event, the profiling arrangement remains in state 302, and the cycle counter value and event type code are written to the profile RAM. When the DONE event is detected in the ENABLED state, the arrangement transitions to READ-BACK state 304 and writes a code to the profile RAM to indicate the end mark of the profile data. The RAM-bus interface 120 to the profile RAM may use the end mark code to read the proper range of addresses for a profile session.

In the READBACK state, the profile RAM may be accessed through the RAM-bus interface until a RESET event is detected. In the example embodiment, once the state is ENABLED, the RAM-bus interface will not provide the access until the READBACK state is again entered. When a RESET event is detected, the profile arrangement is reset and transitions back to the ENABLED state 302. Resetting the profiling arrangement may entail clearing the bits in the profile registers 202 and reinitializing a write address pointer to the profile RAM 104 to reference the first location. Once in the ENABLED state, the profiler may commence recording a new interval of profiling data.

Figure 4:
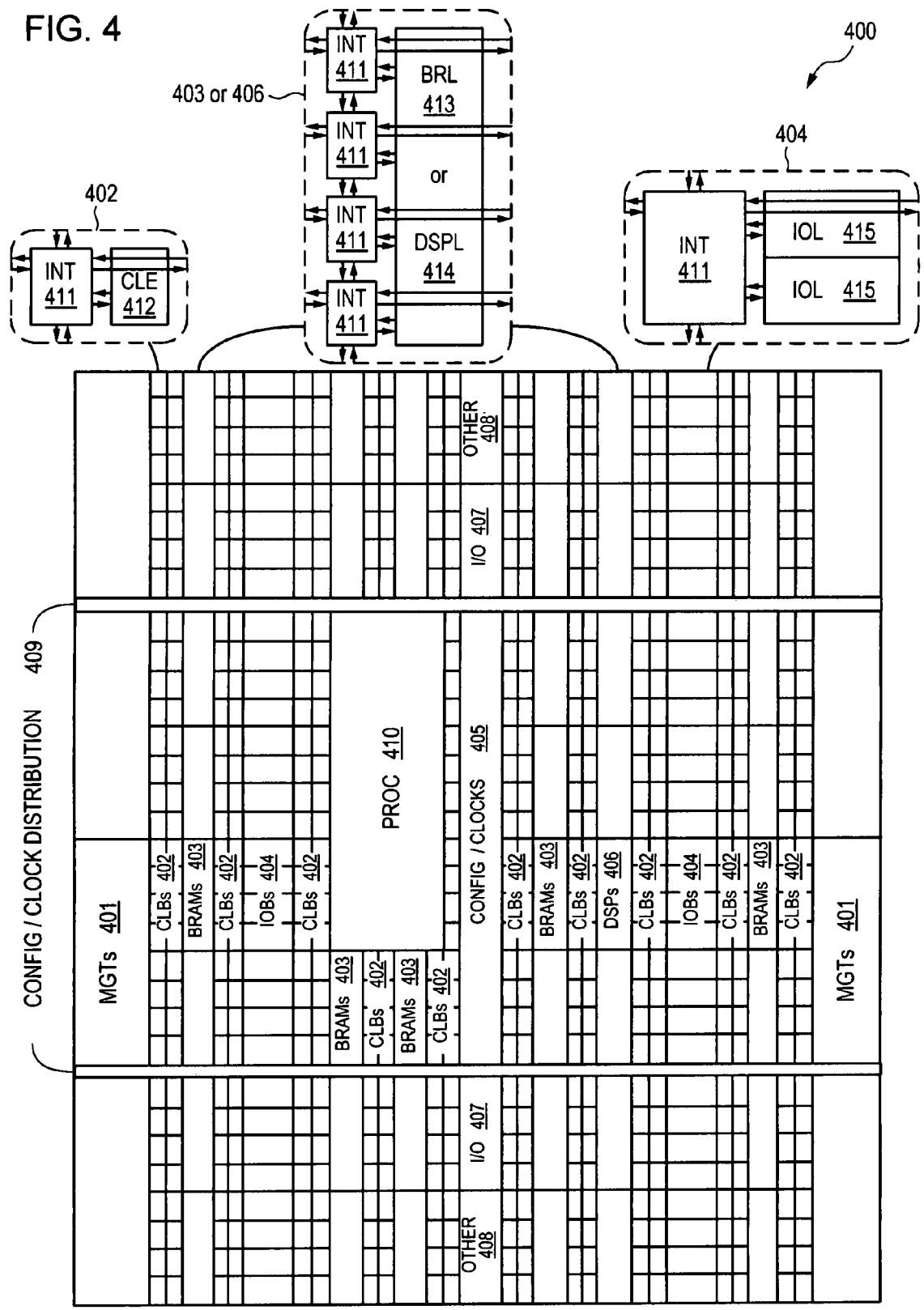
FIG. 4 is a block diagram that illustrates an example field programmable gate array (FPGA) on which an embodiment of the invention may be implemented.

FIG. 4 is a block diagram that illustrates an example field programmable gate array (FPGA) on which an embodiment of the invention may be implemented. Advanced FPGAs may include several different types of programmable logic blocks in the array. For example, FIG. 4 illustrates an FPGA architecture 400 that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407) (e.g., configuration ports and clock ports), and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element (INT 411) also includes the connections to and from the programmable logic element within the same tile, as shown by the examples included at the top of FIG. 4.

For example, a CLB 402 can include a configurable logic element (CLE 412) that can be programmed to implement user logic plus a single programmable interconnect element (INT 411). A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element (INT 411). As will be clear to those of skill in the art, the actual I/O pads connected, for example, to the I/O logic element 415 are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic.

The present invention is thought to be applicable to a variety of systems for profiling electronic circuits. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A structure for tracing events in an electronic system, the structure comprising:
   a bus;
   a first random access memory (RAM);
   an application circuit;
   a processor coupled to the bus;
   a circuit arrangement coupled to the application circuit for receiving a plurality of event indication signals and further coupled to a write port of the first RAM, wherein the circuit arrangement is configured to write to the first RAM, in response to a change in state of any one of the event indication signals, event data indicative of the one of the event indication signals;
   wherein the circuit arrangement is further coupled to the bus for receiving a plurality of event indication signals from the processor, and for each event indication signal from the processor the circuit arrangement writes event data to the first RAM;
   wherein the event data for each event indication signal from both the application circuit and from the processor include an event type code and an associated cycle count value at which the event was detected, the event type codes being descriptive of circuit-generated events from the application circuit and software-controlled events from the processor; and
   a bus interface circuit coupled to the bus and to a read port of the first RAM, wherein responsive to a read transaction on the bus for the first RAM, the bus interface circuit reads data from the first RAM and outputs the data on the bus in a reply bus transaction.

2. The structure of claim 1, wherein the circuit arrangement comprises
   a plurality of registers;
   a first monitor circuit coupled to the plurality of registers and coupled to receive at least one of the plurality of event indication signals from the application circuit, wherein the first monitor circuit is configured to change a state of a first one of the plurality of registers in response to a change in the state of the one of the plurality of event indication signals; and
   a control circuit coupled to the plurality of registers, wherein the control circuit is configured to monitor states of the registers and to write the event data to the first RAM.

3. The structure of claim 2, further comprising a second monitor circuit coupled to the bus and to the plurality of registers, wherein the second monitor circuit is configured to change the state of a second one of the plurality of registers in response to a detected bus transaction on the bus.

4. The structure of claim 3, wherein:
   the detected bus transaction indicates an address corresponding to the second one of the plurality of registers; and
   the second monitor circuit, responsive to the detected bus transaction, generates a response signal on the bus.

5. The structure of claim 4, further comprising:
   a second RAM coupled to the bus, wherein the second RAM and the first RAM do not share an interface to the bus; and
   wherein the processor is configured to issue one or more write transactions that address one or more of the plurality of registers and to issue one or more read transactions to the bus interface circuit.

6. The structure of claim 3, wherein:
the detected bus transaction does not indicate an address corresponding to the address of any one of the plurality of registers; and
the second monitor circuit is configured to select the second one of the plurality of registers for updating without generating a response signal on the bus, in response to a transaction type code in the detected bus transaction.

7. The structure of claim 1, further comprising:
a second RAM coupled to the bus, wherein the second RAM and first RAM do not share an interface to the bus; and
wherein the processor is configured to issue one or more read transactions to the bus interface circuit.

8. The structure of claim 1, wherein the bus, the first RAM and the bus interface circuit are integrated on a single semiconductor die.

9. A method for tracing events in an electronic system, the method comprising:
transmitting by an application circuit a plurality of event indication signals;
receiving the plurality of event indication signals by a circuit arrangement;
writing by the circuit arrangement to a random access memory (RAM), in response to each change in state of each of the event indication signals, event data indicative of the one of the event indication signals;
receiving a plurality of event indication signals from a processor by the circuit arrangement, and for each event indication signal from the processor the circuit arrangement writes event data to the first RAM;
wherein the event data for each event indication signal from both the application circuit and from the processor include an event type code and an associated cycle count value at which the event was detected, the event type codes being descriptive of circuit-generated events from the application circuit and software-controlled events from the processor;
reading data from the RAM by a bus interface circuit in response to a read transaction for the RAM received via a bus; and
outputting the data on the bus in a reply bus transaction by the bus interface circuit.

10. The method of claim 9, further comprising:
monitoring the bus for selected bus transactions, wherein one of the selected bus transactions is detected; and
in response to the detecting of the one of the selected bus transactions, storing in the RAM data descriptive of the detected bus transaction and a time at which the detected bus transaction occurred.

11. The method of claim 9, further comprising:
changing a state of a first one of a plurality of registers in response to the change in the state of one of the plurality of event indication signals;
monitoring states of the plurality of registers; and
writing the event data to the RAM in response to the change in the state of the first one of the plurality of registers.

12. The method of claim 11, further comprising changing the state of a second one of the plurality of registers in response to a detected bus transaction on the bus.

13. The method of claim 12, wherein the detected bus transaction indicates an address corresponding to the second one of the plurality of registers, the method further comprising generating a response signal on the bus in response to the detected bus transaction.

14. The method of claim 13, further comprising:
issuing by the processor coupled to the bus, one or more write transactions that address one or more of the plurality of registers; and
issuing by the processor, one or more read transactions to the bus interface circuit for the RAM.

15. The method of claim 12, wherein:
the detected bus transaction does not indicate an address corresponding to the address of any one of the plurality of registers; and
the method further comprises selecting the second one of the plurality of registers for updating without generating a response signal on the bus, in response to a transaction type code in the detected bus transaction.

16. An apparatus for tracing events in an electronic system, the apparatus comprising:
means for transmitting by an application circuit a plurality of event indication signals;
means for receiving the plurality of event indication signals by a circuit arrangement;
means for writing by the circuit arrangement to a random access memory (RAM), in response to a change in state of any one of the event indication signals, event data indicative of the one of the event indication signals;
means for receiving a plurality of event indication signals from a processor by the circuit arrangement, and for each event indication signal from the processor the circuit arrangement writes event data to the first RAM;
wherein the event data for each event indication signal from both the application circuit and from the processor include an event type code and an associated cycle count value at which the event was detected, the event type codes being descriptive of circuit-generated events from the application circuit and software-controlled events from the processor;
means for reading data from the RAM by a bus interface circuit in response to a read transaction for the RAM received via a bus; and
means for outputting the data on the bus in a reply bus transaction by the bus interface circuit.

* * * * *